INVENTOR.
JAMES A. COOLEY

BY
Robert K. Schumacher
ATTORNEY

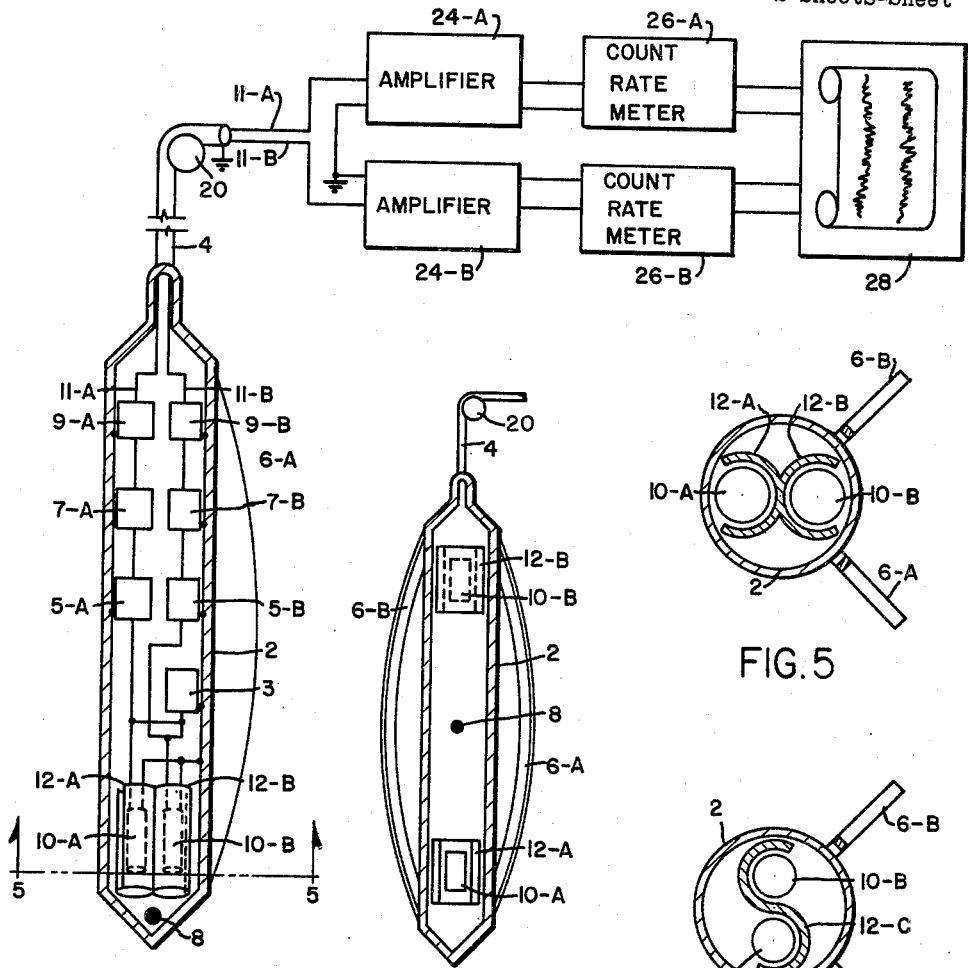

United States Patent Office 3,183,358
Patented May 11, 1965

3,183,358
METHOD AND APPARATUS FOR
NEUTRON WELL LOGGING
James A. Cooley, Tulsa, Okla., assignor, by mesne assignments, to Dresser Industries, Inc., Dallas, Tex., a corporation of Delaware
Filed July 7, 1961, Ser. No. 122,533
4 Claims. (Cl. 250—108)

This invention relates to the art of well logging by means of neutron irradiation of sub-surface substances traversed by a borehole, and more particularly relates to methods and apparatus for making corelative thermal and epithermal neutron logs of such substances during a single trip through the borehole.

It is well known that oil and gas, and other related natural substances generally included within the scope of the generic term "petroleum," are usually found in sub-surface earth and rock strata. It is also well known that recovery of these substances is generally achieved by drilling a borehole in the earth and into, or through, the various strata or formations suspected to contain such oil or other petroleum substances. Of course, it is obviously difficult to determine the character of the various formations insofar as oil-bearing possibilities are concerned, since the formations of interest often lie thousands of feet below the surface of the earth, and since access thereto can only be had through a hole which usually measures but a few inches in diameter.

Various methods and apparatus for vertically surveying or "logging" the borehole have been devised, from time to time, for the purpose of determining one or more characteristics of the traversed substances such as electrical resistivity, density, etc. Based on the data obtained by means of one or more of these techniques conclusions are more or less tentatively reached, by means of empirical formulae, analogous reasoning, and sometimes "educated" guessing, as to the existence of petroleum in profitable quantities in particular formations. Although no well logging techniques currently exist which provide a direct indication of the presence of petroleum, careful measurements of certain characteristics can often serve to eliminate a particular formation from further consideration. For example, it is now well known that petroleum does not exist in these formations in the form of lakes or rivers notwithstanding the common use of the term "pool" in the industry. On the contrary, the sought-for substances exist in a rather finely divided state in the small pockets or cavities between the particles of the materials which compose the formation. Of course, the more porous the formation the larger the cavities, and therefore the amount of fluid which a given volume of the formation may contain depends directly upon its porosity. Although no earth substance is actually entirely solid, even so-called "solid rock," formations composed of materials such as granite can generally be eliminated. On the other hand, layers of sandstone and other sedimentary formations usually warrant consideration.

Of course, porosity measurements alone do not furnish direct indications of the indentity of the fluids reposing in formations. For this reason a method of well logging was devised wherein apparatus, which comprised a neutron source and a neutron detector, is passed through the borehole. In this situation, the source-emitted neutrons penetrate the borehole wall to bombard the surrounding substances, and the detector senses a representative number of those neutrons which have escaped capture and which have re-entered the borehole. It is well-known that "fast" neutrons easily penetrate substances composed mostly of the heavier elements, but that fast neutrons are readily slowed in velocity by substances composed of the lighter elements. Moreover, of all of the lighter elements, hydrogen is by far the most effective in slowing fast neutrons. Thus, since practically all fluids occurring in nature include hydrogen as a major constituent, a sharp decrease in the number of neutrons sensed by a detector (as it passes a particular formation) can be definitely attributed to the presence of fluid in the formation. Unfortunately for the purposes of such a measurement, oil contains about the same percentage of hydrogen as does water. Moreover, both salt and fresh water contain about the same percentage of hydrogen. Nonetheless, this logging technique is widely used in the petroleum industry.

In general, colliding neutrons interact with nuclei of various materials either by "scattering" or by "capture." When a bombarding neutron collides with a nucleus, in the case of elastic scattering, the neutron ricochets off with the only result being at least a partial transfer of kinetic energy to the nucleus and a change in course for the neutron. No radiation results from this type of interaction since there is no transfer of energy from the colliding neutron to the nucleus. In the case of capture, however, the mass-energy of the resultant nucleus is in excess of its binding energy, and this excess is usually immediately given off in the form of gamma rays. It has been fount that the energies of these gamma rays are characteristic of the bombarded nuclei, and therefore, in some well logging techniques a measurement of these energies is used to identify the substances bombarded.

The type of interaction occurring as a result of neutron bombardment is difficult to identify. However, it has been learned that the type of reaction depends in a large part upon the energies of the colliding neutron and nucleus and upon their relative masses. Thus, if a hydrogen atom, which has only a proton as its nucleus, is involved in the interaction the neutron may lose as much as 100% of its energy in the collision since a proton and a neutron have approximately the same mass. It has been determined that, on the average, a neutron will lose about 67% of its energy when colliding with the nucleus of a hydrogen atom, and therefore the average neutron will require very few collisions before being slowed to thermal energy and captured. On the other hand, if the collision involves a heavier substance such as carbon or oxygen, on the average the neutron will lose very little of its energy, and therefore will require many more collisions before being slowed to thermal energies. Insofar as their respective energies are concerned, neutrons may be somewhat arbitrarily classified as "fast" (having energies greater than about 100 electron volts), "epithermal" (having energies of about 0.25 to 100 electron volts), and "thermal" (having energies less than about 0.25 electron volt).

It is well known, however that the probability that a particular nucleus will be struck by a neutron also depends upon the size of the nucleus. This probability is referred to as the "reaction cross section," and although it is not necessarily equal to the actual physical areas of the subject nucleus, it has been mathematically determined in "barns" (one barn equal $10^{-24}$ cm.$^2$) for many of the elements in the atomic table. Of course, since the probability of a nuclear reaction also depends upon the energy of the bombarding neutron, the reaction cross section of a particular material will vary with the energy of the neutron. The reaction cross section of the bombarded substances surrounding a borehole becomes very significant in so-called neutron-neutron logging, when a source of neutrons of a pre-determined average energy is used in the logging equipment.

Since, as hereinbefore stated, practically all of the naturally occurring liquids encountered by the borehole consist of either oil or water, and are therefore hydrogenous, the neutron capture cross section of hydrogen is very significant in well logging. Of course, a well logging measurement of the extent of hydrogen in the substances composing or occupying a particular formatoin cannot distinguish between oil and water, even if the porosity of the formation has been pre-determined, since hydrogen is about as abundant in water as it is in oil. Nonetheless the moderating effect of hydrogen upon a flux of neutrons is a significant phenomenon, and forms the basis of a great many radiological well logging measurements.

Chemically, oil may be distinguished from water by the carbon forming the oil, and by the oxygen atoms forming the water molecules. Thus it might be thought that, if the capture cross section of these two elements were distinguishably different, this might furnish a basis for identification. However, the capture cross section of carbon varies according to the energy of the bombarding neutron and ranges from 4.5 millibarns, for thermal neutrons, to more than one barn for neutrons having 6 mev. energy. On the other hand, oxygen has no real capture cross section for neutrons of any energy, as the term "capture" has been used herein, although inelastic scattering has been achieved with neutrons having energies in excess of 6 mev.

It is well known, however, that most of the subsurface water which is encountered at depths at which petroleum may be expected, is saline rather than fresh. Thus, it was early thought that the chlorine in the salt water might furnish a conclusive test of the character of a hydrogenous formation, if a measurement of the attenuating effect of chlorine, on a flux of neutrons, could be compared with a measurement of the moderating effect thereon of the hydrogen. Several techniques employing this principle have been developed and are now being used in the industry. Although some of these procedures indeed furnish useful data, they are not conclusive and must be supplemented by lithological and other measurements before a reasonable degree of certainty is obtained. Among the more useful of these procedures is one in which three preferably simultaneous measurements are made which consist of a conventional natural gamma ray log, a conventional neutron-neutron log to measure the moderating effect of the hydrogen, and a special neutron-gamma log involving the measurement of the gamma rays produced by the capture of a colliding neutron by a bombarded nucleus, as hereinbefore described. The character of the nucleus struck is determined by the energy level of the emitted gamma rays. Although bombarded chlorine nuclei emit gamma rays having a wide range of energies, spectral analysis has shown peaks of intensity at 6.12 mev. and 1.97 mev. energy levels. Theoretically, if detection equipment is used which is sensitive only to gamma rays having energies greater than 6 mev., the measurement obtained therewith would be indicative of the extent of the chlorine. Of course, in actual well logging practice it is usually necessary to establish a much lower acceptance level, energy-wise, since gamma rays of greater than 6 mev. will lose a substantial amount of their energy before reaching the detector. Thus, a discriminator setting, which permits recordation of pulses due to energy levels greater than 2 mev., will also permit recordation of pulses produced by gamma days emitted by neutron capture by hydrogen at points near the detector. Nevertheless, a comparison of a neutron-gamma log with a neutron-neutron log frequently provides a useable indication of chlorine, if the lithology is also known, but the results are often inconclusive and are never quantitative.

These disadvantages of the prior art are overcome with the present invention, and novel methods and apparatus are provided which furnish a substantially conclusive determination of the presence and relative extent of chlorine in subsurface formations.

The advantages of the present invention are preferably attained by making a so-called "thermal" neutron log of the substances surrounding a fluid-filled borehole, corelatively with an "epithermal" log thereof, and determining salinity by means of dissimilarities between the two logs. More particularly, apparatus containing a source of fast neutrons and a means for selectively detecting thermal and epithermal neutrons is passed through the borehole in a manner which provides a flux or cloud of neutrons in the surrounding substances. Assuming that the neutron source emission includes at least a substantial portion of fast neutrons, the substances will exercise a moderating effect thereon according to their chemical constituency. The space distribution of the cloud of relatively slow neutrons, including both thermal and epithermal energies will depend primarily on the hydrogen in the substances, and a neutron detector positioned in the neighborhood of the source will produce an indication of hydrogen content. If the detection means is selectively sensitive to thermal neutrons, it will give substantially the same type of hydrogen indication as will a neutron-neutron log with the detector selectively sensitive to epithermal neutrons. However, the detector means respond differently when chlorine forms a substantial part of the surrounding substances. The neutron capture cross section of chlorine, for thermal neutrons, has been determined to be approximately 32,000 milli-barns, whereas, for epithermal neutrons it falls off progressively with increasing energy. Thus, an epithermal neutron-neutron log, which detects only neutrons having an energy sufficiently high that they are not likely to be captured by chlorine is for practical well logging purposes insensitive to even a highly chlorinous substance; and the dissimilarity between correlative thermal and epithermal neutron logs will furnish an indication of the presence and extent of chlorine in the formation fluid.

Of course, the penetrating neutrons emitted by the source tend to be slowed to some extent by any substance which may block their path. However, this tendency varies according to the consistency of the irradiated substance. Thus, the purpose of the present invention is, in effect, to make a measurement of the number of neutrons which are "thermalized" (slowed to thermal energy) in the formations surrounding the borehole, and a corelative measurement of the number of neutrons which are "epithermalized" in these formations, and to record these measurements in a manner in which they may be meaningfully compared to each other. The value of the comparison, however, will depend heavily upon extent to which the two measurements are corelative, and therefore it is essential that provision be made to negative borehole effect and such other factors which tend to limit the accuracy and reliability of most of the present well logging practices. In a co-pending application for U.S. Letters Patent filed by Arthur H. Youmans on July 7, 1961, Serial Number 122,538, covering methods and apparatus for well logging, there is disclosed the novel practice of utilizing the slowing effect of the borehole fluids for making corelative thermal and epithermal neutron measurements. Specifically the useful feature of the Youmans invention consists of disposing a thermal neutron detector adjacent the borehole wall to measure the thermal neutrons emanating therefrom, and then displacing the thermal neutron detector laterally from the wall, so that the detector is surrounded by the borehole fluid, to corelatively measure the neutrons which leave the borehole wall at epithermal energies but which are slowed in the fluid to thermal, and thus detectable, energy. The fluid, of course, slows and captures those neutrons which approach the detector at thermal energy. Although such a practice is very effective in those boreholes which are substantially larger in diameter than the instrument, it is considerably less effective in those small diameter boreholes where very little fluid can be interposed between the detector and the borehole wall. The present invention overcomes this disadvantage of the Youmans invention, and provides for the selective measurement of both thermal and epithermal neutrons in a manner which is substantially independent of the size of the borehole cross section.

Accordingly, it is an object of the present invention to provide novel methods and apparatus for investigating the character of subsurface materials surrounding a borehole.

It is also an object to provide novel well logging methods and apparatus for distinguishing saline fluids in subsurface earth formations.

It is further an object of the present invention to provide novel methods and apparatus to measure the moderating effect had by subsurface formations on a flux of neutrons.

A specific object of the present invention is to provide in a radiological system for investigating the character of subsurface substances surrounding a borehole, said system comprising a housing adapted to be passed through said borehole, a source of fast neutrons disposed in said housing, neutron sensing means disposed in said housing, and means for urging said housing laterally in said borehole, the improvement in combination therewith comprising shielding means selectively disposed in a partially surrounding manner about said sensing means and formed of a material having a relatively high thermal neutron capture cross section and a relatively low epithermal neutron capture cross section.

Another specific object of the present invention is to provide in a radiological system for investigating the character of subsurface substances surrounding a borehole, said system comprising a housing adapted to be passed through said borehole, a source of fast neutrons disposed in said housing, and means for urging said housing laterally in said borehole, the improvement in combination therewith comprising neutron sensing means disposed in said housing, and shielding means selectively disposed in a partially surrounding manner about said sensing means and formed of a material having a relatively high thermal neutron capture cross section and a relatively low epithermal neutron capture cross section.

These and other objects and features of the present invention will be apparent from the following detailed description wherein reference is made to the figures in the accompanying drawings.

In the drawings:

FIGURE 3 is a view of a radiological system employing another form of the present invention.

FIGURE 4 is a view of a radiological system employing a third form of the present invention.

FIGURE 5 is another view of apparatus depicted in FIGURE 3.

FIGURE 6 is a view of a modified form of apparatus depicted in FIGURES 3, 5, and 6.

Figures 1, 2:
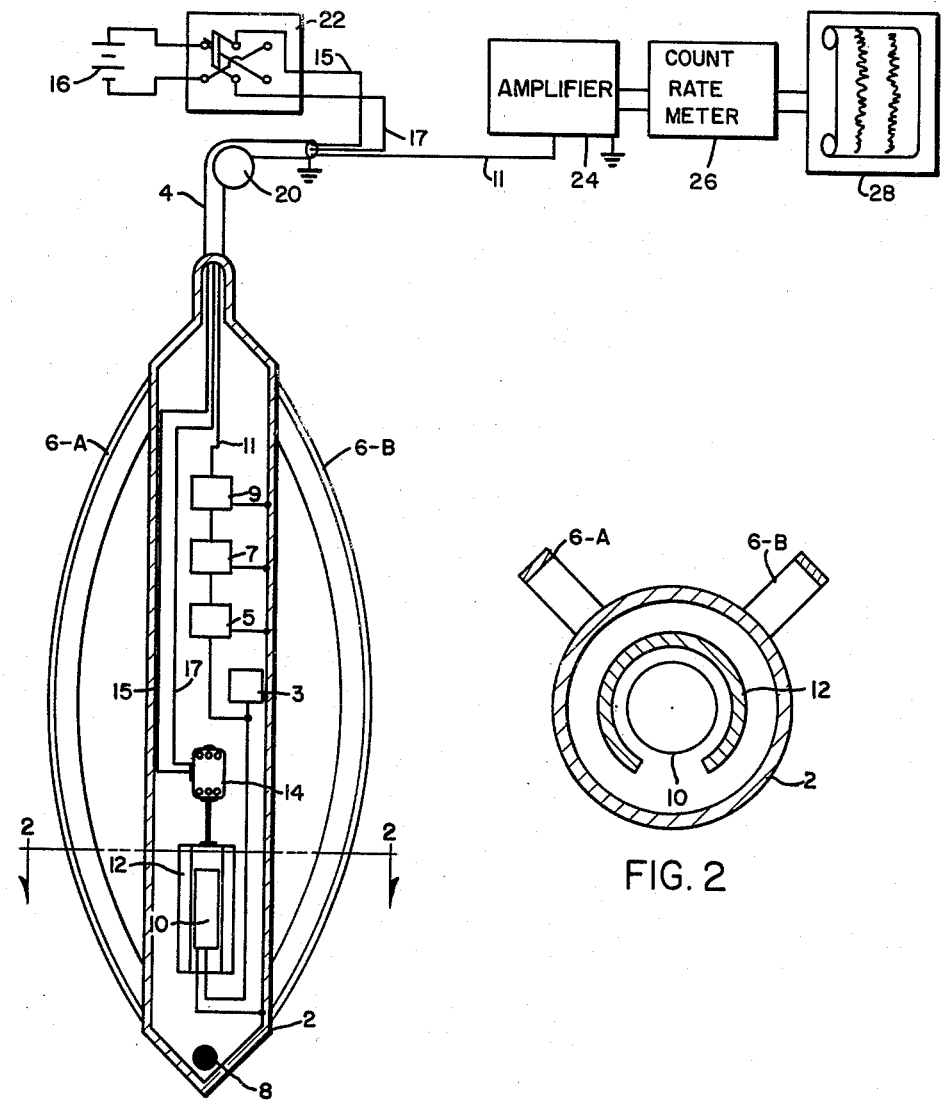
FIGURE 1 is a view of a radiological system employing one form of the present invention.
FIGURE 2 is another view of apparatus depicted in FIGURE 1.

Referring now to FIGURE 1, there is shown a subsurface logging instrument housing 2, which is connected to a cable 4 for the purpose of being drawn through a borehole (not depicted). The housing 2 is preferably equipped with means for urging it against the wall of the borehole, which equipment may be composed of one or more flexible bowsprings 6A and 6B as depicted. Within the housing 2, there is disposed a source 8 of fast neutrons which may be an encapsulated mixture of radium or plutonium and beryllium, or an ion beam accelerator such as that depicted in U.S. Letters Patent No. 2,689,918, issued to Arthur H. Youmans on September 21, 1954. Disposed from the source 8 there is shown a radiation detector 10 which may be apparatus such as the well-known boron tri-fluoride proportional counter, or which may be a scintillation counter having a phosphor composed of silver-activated zinc sulfide mixed with boron tri-oxide. The detector 10 is energized by a suitable power source 3, and is preferably housed within a shield 12 which may be formed of cadmium or gadolinium, or of some other material having a relatively high thermal neutron capture cross section and a relatively low epithermal neutron capture cross section. The shield 12 is formed to substantially encompass or surround the detector 10, and therefore may have the shape of a sleeve having that end closed which faces or is directed toward the source 8. However, although it is necessary that the shield 12 provide the detector 10 with a barrier to thermal neutron radiation from most directions, it is necessary that the shield 12 be shaped or adapted in some manner to admit radiation to the detector 10 which approaches from at least one general direction. Thus, the shield 12 may be provided with a window, or, as depicted in FIGURE 1, the sleeve-like shield 12 may be adapted to only partly surround the detector 10, and therefore to expose the detector 10 in one pre-determined direction diametrically with respect to the borehole. Since it is desirable that this direction be pre-determined, the housing 2 may be made selectably rotatable with respect to the bowsprings 6A and 6B, or the shield 12 may be made selectably rotatable with respect to the detector 10. In FIGURE 1, which depicts the latter case, the shield 12 is shown fixed to or supported by a suitable rotating means 14 such as an electric motor. The rotating means 14 may be energized by a suitable power supply 16, and controlled by a switch 22, which is located at the surface of the earth. When the switch is closed, current of one polarity or the other is supplied over leads 15 and 17 contained in the cable 4 to drive the shield in the desired direction. The switch may be opened when the shield has been rotated to the desired position, which may be determined by a stop.

Referring now to FIGURE 2, there is shown a cross section view of the housing 2 and bowsprings 6A and 6B taken along section 2—2 of FIGURE 1. In this view of the present invention, the shield 12 is disposed about the detector 10 in a manner such that when the housing is urged against the wall of the borehole, the shield 12 permits the detector 10 to "see" those neutrons emitted by the source 8, which are slowed to thermal energy in the substances surrounding the borehole, and which re-enter the borehole through that part of the borehole wall against which the housing 2 is urged by the bowsprings 6A and 6B. On the other hand, when the shield 12 is rotated 180 degrees so that the detector 10 is exposed towards the opposite direction, the shield 12 will block those thermal neutrons approaching the detector 10 from substantially any direction except this opposite direction. Other neutrons entering the borehole at thermal energy will be generally captured by the borehole fluids. However, those neutrons which enter the borehole at epithermal energies will be generally slowed to thermal, and therefore detectable, energy before reaching the detector 10. The responses of detector 10, when composed of a proportional counter of the type hereinbefore described, and when selectively shielded in such a manner, will provide corelative thermal and epithermal logs of the formations traversed by the borehole.

Referring again to FIGURE 1, there is shown a power pack 3 which is connected to energize the detector 10. The output signal from the detector 10 may be passed through an amplifier 5 to a discriminator 7 for the purpose of the elimination of unwanted pulses such as noise. The output pulses produced by the discriminator 7 may then be passed through a pulse shaping circuit 9 before being passed through the surface of the earth by way of a conductor 11 contained in the cable 4. At the surface, the conductor 11 transmits the output of the pulse shaping circuit 9, by way of a surface amplifier 24, to a count rate meter 26. The output of the count rate meter 26 may be connected to a recorder 28 for providing a graphic display of the functional characteristics of the detector 10 output signal corelatively with an indication of the borehole depth at which the detector 10 output signal is generated. This depth indication may be derived from the operation of a measuring wheel 20, from which the cable 4 is suspended, and over which the cable 4 and all attached downhole apparatus may be drawn by some means not herein depicted. The measuring wheel may be suspended in any convenient manner, such as by a traveling block suspended over the mouth of the borehole by a derrick.

The essentials of most radioactivity well logging operations can be broadly summarized as a measurement of either the rate of occurence of some pre-selected class of radiations (at various levels in a borehole), or a measurement of the energy of the occurring radiations, or a combination measurement of both rate and energy. It is obvious that any measurement of this type must be precise, and that interfering factors must be minimized or avoided, for it to be meaningful. In the case of neutron measurements of any type, one of the most important obstacles to accuracy is the fluid in the borehole. This is due to the moderating effect exercised on the neutrons by the fluid. Many techniques have been devised for overcoming this effect. Inflatable bags have been placed about the logging tool, aluminum sleeves have been slideably disposed about the detecting section of the tool, and various types of apparatus have been devised for de-centralizing the tool in the borehole. It is probable that no technique, short of completely bailing out the borehole, will ever be devised which will completely eliminate the effect of the borehole fluids. However, the aforementioned application Serial Number 122,538, by Arthur H. Youmans, teaches novel methods and apparatus for selectively measuring thermal and epithermal neutrons by utilizing the moderating capability of the borehole fluid. As disclosed therein, the apparatus comprises a neutron supply, detection means preferentially sensitive to thermal neutrons, and a housing having some means for selectively positioning it laterally in the borehole. When apparatus so designed is urged against the borehole wall (de-centralized), the fluids surrounding the detection means on all sides except that adjacent the contacted wall provide (in theory) shielding against all thermal neutrons except those leaving that general part of the borehole wall. Since the detection means is preferentially sensitive to thermal neutrons, the resulting measurement is presumably a count of those source-emitted neutrons which are thermalized (slowed to thermal energy) in the formation. On the other hand, when the tool is displaced from the wall in a manner such that the fluid completely surrounds the detection means, the resulting measurement is presumably a count of those source-emitted neutrons which leave the borehole wall at epithermal energies and are thereafter slowed by the fluid to thermal (and therefore detectable) energy. If the counting rate obtained with the tool de-centralized is significantly smaller than when the tool is more or less centralized, the decrease may be reasonably attributed to the presence of chlorine in the formation, since chlorine possesses a thermal neutron capture cross section which is approximately one hundred times the thermal neutron capture cross section of hydrogen. On the other hand, if substantially similar counting rates are obtained adjacent a formation which is known to be porous, this similarity furnishes a strong indication of the presence of either fresh water (which is generally unlikely) or petroleum.

The principle of the Youmans teaching is valid. However, the significance of the foregoing measurements are based on the difference in the thermal neutron capture cross sections of chlorine and hydrogen, and thus the accuracy of the technique makes it desirable that a maximum number of neutrons, which are thermalized and epithermalized in the formation, be detected and counted in the two logging instrument positions. Unfortunately for this relationship, the Youmans apparatus is incapable when de-centralized of sensing only neutrons entering the borehole from the borehole wall at thermal energy.

To overcome these difficulties, the apparatus depicted in FIGURE 1 herein may be provided with a shield 12, which is disposed about the detector 10, and which is provided with a slot or window facing laterally when the housing 2 is suspended in the borehole. The shield should be closed between the source 8 and the detector 10, to prevent direct irradiation of the detector 10, and is preferably formed of a material which has a relatively high thermal neutron capture cross section, and a relatively low epithermal neutron capture cross section.

Referring now to FIGURE 2, there can be seen how the shield 12, which may be a cadmium or gadolinium sheet formed substantially but not entirely about the detector 10, blocks all thermal neutron radiation from the detector 10 except that which approaches from that part of the borehole wall against which the bowsprings 6A and 6B urge the housing 2. Thus, with the shield 12 positioned with its slot, or "window," toward the direction or urging by the bowsprings 6A and 6B, the detector 10 will sense substantially only neutrons which are thermalized in the adjacent formation. Those neutrons which approach from other directions at speeds such that they are slowed in the borehole fluid to thermal energy are screened from the detector 10 by the shield 12. In addition, those neutrons which approach the detector 10 at speeds above thermal energy, and which are therefore capable of traversing the shield 12, generally penetrate and pass through the detector 10 without registering if the sensing means is preferentially responsive of thermal neutrons in the manner of a boron trifluoride counter.

Alternatively, if the housing 2 depicted in FIGURE 2 is rotated 180 degrees with respect to the bowsprings 6A and 6B, and if the logging tool is then restored to the same position in the borehole as before, the window of the shield 12 will now be "aimed" away from the direction of urging and therefore oppositely from before. The shield 12 will now block from the detector 10, not only those neutrons thermalized in the earth against the housing 2, but also those neutrons which were thermalized in the formation and which traverse without capture the relatively thin sections of fluid standing between the housing 2 and adjacent borehole wall areas. Thus, the revolved shield 12 renders the detector 10 almost completely insensitive to any of the neutrons which are sought to be included in the thermal neutron measurement.

Referring again to FIGURE 1, there is depicted apparatus for permitting the shield 12 to be selectively positioned while the logging tool is suspended in the borehole. As shown, the shield 12 is attached to the shaft of an electric motor 14 which may be energized by any suitable power supply 16 which may be located at the surface of the earth. The power supply 16 may be selectively connected to operate the motor by means of double pole-double throw switch 22 located at the surface of the earth. The power supply 16 is thus connected to electric motor 14 by means of conductors 15 and 17 which are preferably included with conductor 11 within the cable 4. The shield is rotated to one position or the other by throwing switch 22 to the respective position. The motor rotates the shield until the shield is in position, which it may be determined by fixed stops. The switch may then be opened while the logging operation is performed.

It is desirable that all environmental factors, under which both the thermal and epithermal neutron measurements are made, be corelated as much as possible in order to provide maximum corelation of the two measurements. FIGURE 3 depicts apparatus similar to that shown in FIGURES 1 and 2 for providing both measurements simultaneously and therefore corelatively with respect to borehole depth. As shown in FIGURE 3, the housing 2 containing at least one source 8 of fast neutrons is adapted for de-centralization in the borehole by bowsprings 6A and 6B (not depicted) in the manner shown in FIGURE 1. The downhole apparatus shown in FIGURE 3 differs from that shown in FIGURE 1 in that the sensing means is composed of two detectors 10A and 10B instead of only one as before. One detector 10A, hereinafter referred to as the "thermal neutron detector" 10A, may be arranged in the housing 2 in a manner so as to be adjacent that part of the borehole wall against which the housing 2 is urged by the bowsprings 6A and 6B. The other detector 10B, hereinafter referred to as the "epithermal neutron detector" 10B, may be arranged so as to be displaced from that part of the borehole wall against which the housing 2 is urged. Both detectors 10A and 10B may be served by the power source 3 depicted in FIGURE 1. Signals from the thermal neutron detector 10A are passed to a "thermal neutron signal circuit" which may include a pulse amplifier 5A, a discriminator 7A, and a pulse shaper 9A. Signals from the epithermal neutron detector 10B are passed to an "epithermal neutron signal circuit" which may include a pulse amplifier 5B, a discriminator 7B, and a pulse shaper 9B. The output of the "thermal neutron signal circuit" may be transmitted to an amplifier 24A at the surface of the earth by means of a conductor 11A contained in the cable 4 as heretofore described. In the same manner, the output of the "epithermal neutron signal circuit" may be separately transmitted to another amplifier 24B at the surface by means of a separate conductor 11B in the cable 4. Alternatively, the outputs of both "signal circuits" may be conducted to the surface by means of a common conductor 11 (see FIGURE 1), and thereafter separated in a conventional manner before being applied to their respective amplifiers 24A and 24B. The output pulses of both amplifiers 24A and 24B are respectively passed to associated counting rate meters 26A and 26B, in the manner shown in FIGURE 3. The outputs of both counting rate meters 26A and 26B are then, in turn, connected to the recorder 28.

In order that the outputs of both the thermal and epithermal neutron detectors 10A and 10B be made representative of the classes of neutrons they are respectively intended to sample, it is preferable that the thermal neutron detector 10A be preferentially sensitive to thermal neutrons and substantially surrounded by a shield 12A, which is formed and positioned substantially as shield 10 in FIGURE 2. Neither the housing 2 nor shield 10A need be made rotatable, however, although the window in the shield 10A is preferably aimed in the direction which the bowsprings 6A and 6B are arranged to urge the housing 2. The epithermal neutron detector 10B, which may be sensitive to epithermal neutrons, is preferably disposed similarly in a substantially surrounding shield 12B having a window aimed oppositely to the urging direction. Both shields 12A and 12B are preferably formed of a material having a relatively high thermal neutron capture cross section and a relatively low epithermal neutron capture cross section.

Referring now to FIGURE 5, there may be seen a cross sectional view, of the sensing portion, taken along section 5—5 of FIGURE 3. Shown therein are the housing 2 and bowsprings 6A and 6B. Disposed within the housing 2 are the thermal and epithermal neutron detectors 10A and 10B respectively, together with their respective shields 12A and 12B.

FIGURE 6 depicts a modification of the detector-shield configuration shown in FIGURES 3 and 5. In this case, which is useful in boreholes of larger diameter, both detectors 10A and 10B are aligned perpendicularly with respect to the direction, in which the housing is urged by the bowsprings, and are both spaced equidistantly from the section of borehole wall toward which the housing 2 is pressed. A shield 12C, formed of material having relative thermal and epithermal neutron capture cross section as heretofore described, is disposed in an interwoven manner about the two detectors 10A and 10B in a manner such that detector 10A is exposed in the general direction of the adjacent borehole wall and such that detector 10B is exposed in generally the opposite direction.

In FIGURE 4 there may be seen a further modification of the present invention which is particularly useful in small diameter boreholes. In this case, the thermal neutron detector 10A is disposed within the shield 12A having its window aimed in the direction in which the housing 2 is urged by the bowsprings 6A and 6B. The epithermal neutron detector 10B is disposed within the shield 12B having its window aimed oppositely to the urging direction. The apparatus depicted in FIGURE 4 differs from that heretofore described, however, in that the two detectors 10A and 10B are each disposed on opposite sides of the radiation source 8. In this, as in all the cases hereinbefore described, it is desirable that each detector 10A and 10B be screened from direct irradiation by the source 8.

Since even a boron tri-fluoride counter is somewhat sensitive to low energy epithermal neutrons, the shield 12A in FIGURES 4 and 5 and that section of shield 12C in FIGURE 6 which shelters the thermal neutron detector may be formed of a material such as boron-10 to further improve the thermal neutron measurement.

Numerous other variations and modifications may obviously be made without departing from the scope of the present invention. Accordingly, it should be clearly understood that the forms of the invention described above and shown in the figures of the accompanying drawings are illustrative only and are not intended to be construed as limitations thereon.

What is claimed is:

1. In a radiological system for investigating the character of subsurface substances surrounding a borehole, said system comprising an elongated housing adapted to be passed longitudinally through said borehole, a source of fast neutrons disposed in said housing, thermal neutron sensing means also disposed within said housing and spaced from said source longitudinally of said housing, and means for urging said housing diametrically in said borehole in a manner such that said sensing means is positioned in close proximity to a part of the wall of said borehole, the improvement in combination therewith comprising a shield having a window and rotatably disposed about said sensing means, said shield being formed of a material having a relatively high thermal neutron capture cross section and a relatively low epithermal neutron capture cross section.

2. In a radiological system for investigating the character of subsurface substances surrounding a borehole, said system comprising an elongated housing adapted to be passed longitudinally through said borehole, a source of fast neutrons disposed in one end of said housing, and means for urging said housing laterally toward a part of the wall of said borehole, the improvement in combination therewith comprising a pair of thermal neutron detectors also disposed in said housing and spaced longitudinally of said housing substantially equidistantly from said source in a manner such that one of said detectors is in close proximity to said part of said borehole wall and the other of said detectors is displaced laterally from said part of said borehole wall, and shielding means arranged to partially surround said pair of detectors in a manner such as to expose said one detector in the direction of said part of said borehole wall and to expose said other detector in the direction opposite said direction of said part of said borehole wall, said shielding means being formed of a material having a relatively high thermal neutron capture cross section and a relatively low epithermal neutron capture cross section.

3. In a radiological system for investigating the character of subsurface substances surrounding a borehole, said system comprising an elongated housing adapted to be passed longitudinally through said borehole, a source of fast neutrons disposed in said housing, and means for urging said housing laterally toward a part of the wall of said borehole, the improvement in combination therewith comprising a pair of thermal neutron detectors arranged in said housing substantially equidistantly from said source and substantially equidistantly from and in close proximity to said part of said borehole wall, and shielding means partially disposed about said detectors in a manner such that one of said detectors is exposed toward said part of said borehole wall and such that the other of said detectors is exposed in the direction opposite said part of said borehole wall, said shielding means being composed of a material having a relatively high thermal neutron capture cross section and a relatively low epithermal neutron capture cross section.

4. In a radiological system for investigating the character of subsurface substances surrounding a borehole, said system comprising an elongated housing adapted to be passed longitudinally through said borehole, a source of fast neutrons disposed in said housing, and means for urging said housing laterally in said borehole toward a part of the wall of said borehole, the improvement in combination therewith comprising a pair of thermal neutron detectors arranged in said housing and spaced longitudinally substantially equidistantly from said source, and shielding means arranged to partially surround said detectors in a manner such that one of said detectors is exposed in the direction of said part of said borehole wall and such that the other of said detectors is exposed in the direction opposite said direction of said part of said borehole wall, said shielding means being formed of a material having a relatively high thermal neutron capture cross section and a relatively low epithermal neutron capture cross section.

References Cited by the Examiner
UNITED STATES PATENTS

| | | | |
|---|---|---|---|
| 2,220,509 | 11/40 | Brons | 250—83.6 |
| 2,316,361 | 4/43 | Piety | 250—83.6 |
| 2,543,676 | 2/51 | Thayer et al. | 250—83.6 |
| 2,667,583 | 1/54 | Herzog | 250—83.6 |
| 2,769,915 | 11/56 | Tittle | 250—71.5 |
| 2,769,918 | 11/56 | Tittle | 250—71.5 |
| 2,778,951 | 1/57 | Tittman | 250—83.6 |
| 2,875,347 | 2/59 | Anderson et al. | 250—108 |
| 2,879,402 | 3/59 | Ferre | 250—108 |
| 2,950,393 | 8/60 | Southward | 250—108 |
| 2,971,094 | 2/61 | Tittle | 250—83.6 |
| 3,065,346 | 11/62 | Dewan et al. | 250—108 |
| 3,080,478 | 3/63 | Scherbatskoy | 250—83.6 |
| 3,095,505 | 6/63 | Dewan | 250—108 |

RALPH G. NILSON, *Primary Examiner.*

ARCHIE R. BORCHELT, *Examiner.*